United States Patent
Liebenow

(10) Patent No.: US 6,552,909 B1
(45) Date of Patent: *Apr. 22, 2003

(54) COMPUTER OPTION BAY HAVING SECONDARY ACCESS PORT WITH AUTOMATIC SLIDING DOOR MECHANISM

(75) Inventor: Frank Liebenow, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/045,383

(22) Filed: Oct. 23, 2001

Related U.S. Application Data

(63) Continuation of application No. 09/108,494, filed on Jul. 1, 1998, now Pat. No. 6,307,745.

(51) Int. Cl.⁷ ................................................. G06F 1/16
(52) U.S. Cl. ........................ 361/725; 361/683; 361/686; 361/724
(58) Field of Search ................................. 361/679, 683, 361/686, 724, 725; 439/945, 946

(56) References Cited

U.S. PATENT DOCUMENTS 6,040,979 A  *  3/2000  Homer ........................ 361/683

* cited by examiner

Primary Examiner—Darren Schuberg
Assistant Examiner—Yean-Hsi Chang
(74) Attorney, Agent, or Firm—Kevin E. West; Scott Charles Richardson; Suiter & Associates

(57) ABSTRACT

A computer system having a housing including an option bay into which a modular option device may be removably inserted is disclosed. The option bay includes a secondary access port providing access to the modular option device for uncluttered connection of lines and easy access to control functions. The secondary access port may be covered by a sliding door that opens automatically upon insertion of selected modular option devices into the option bay.

27 Claims, 4 Drawing Sheets

COMPUTER OPTION BAY HAVING SECONDARY ACCESS PORT WITH AUTOMATIC SLIDING DOOR MECHANISM

CROSS REFERENCE TO RELATED APPLICATIONS

The present application is a continuation of U.S. patent application Ser. No. 09/108,494, filed Jul. 1, 1998 now U.S. Pat. No. 6,307,745. Said U.S. patent application Ser. No. 09/108,494 is herein incorporated by reference in its entirety.

FIELD OF THE INVENTION

The present invention relates generally to computer systems and more specifically to computer option bays commonly utilized in portable computers to allow the addition of hardware and software options thereto via the insertion of user selected modular option devices.

BACKGROUND OF THE INVENTION

Portable computers provide many advantages in mobility and versatility over conventional desktop computer systems. These computers, often called notebook or laptop computers, typically comprise a clam-shell type housing including a main body section providing a keyboard and a lid having a built-in display. The main body section and lid can be folded together so that the computer can be easily carried by a user. Because of their light weight and small size, however, portable computers typically cannot provide many of the hardware and software options commonly found in their full size counterparts. To overcome this shortcoming, many portable computers include an option bay which facilitates the addition of hardware or software options via insertion of interchangeable modular option devices. These commonly include devices such as removable hard drives, floppy disk drives, CD-ROM (Compact Disk-Read Only Memory) drives, batteries, or ac adapters.

Many of the devices commonly utilized with an option bay require frequent access by the user. Thus, it is usually preferable to position the option bay in the front of the computer where access to a device inserted therein is more convenient. Other option devices such as, for example, modems or ac transformers require connection of an external line or cable. For these devices, it may be preferable to position the option bay in the side or rear of the computer so that a line or cable extending from the device will not interfere with use of the computer. Due to the limited size of most portable computers, it may be impossible to provide multiple option bays to accommodate both of the before-described types of modular option devices.

Therefore, it would be advantageous to provide a portable computer having an option bay which provides access to a modular option device from the front of the computer wherein the option bay includes a secondary access port opening to the side of the computer to provide access to the modular option device for uncluttered connection of lines and easy access to control functions.

SUMMARY OF THE INVENTION

Accordingly, the present invention is directed to a computer system having a novel housing including an option bay into which a modular option device may be removably inserted. The option bay includes a secondary access port providing access to the modular option device for uncluttered connection of lines and easy access to control functions. The secondary access port may be covered by a sliding door which opens automatically upon insertion of selected modular option devices into the option bay.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
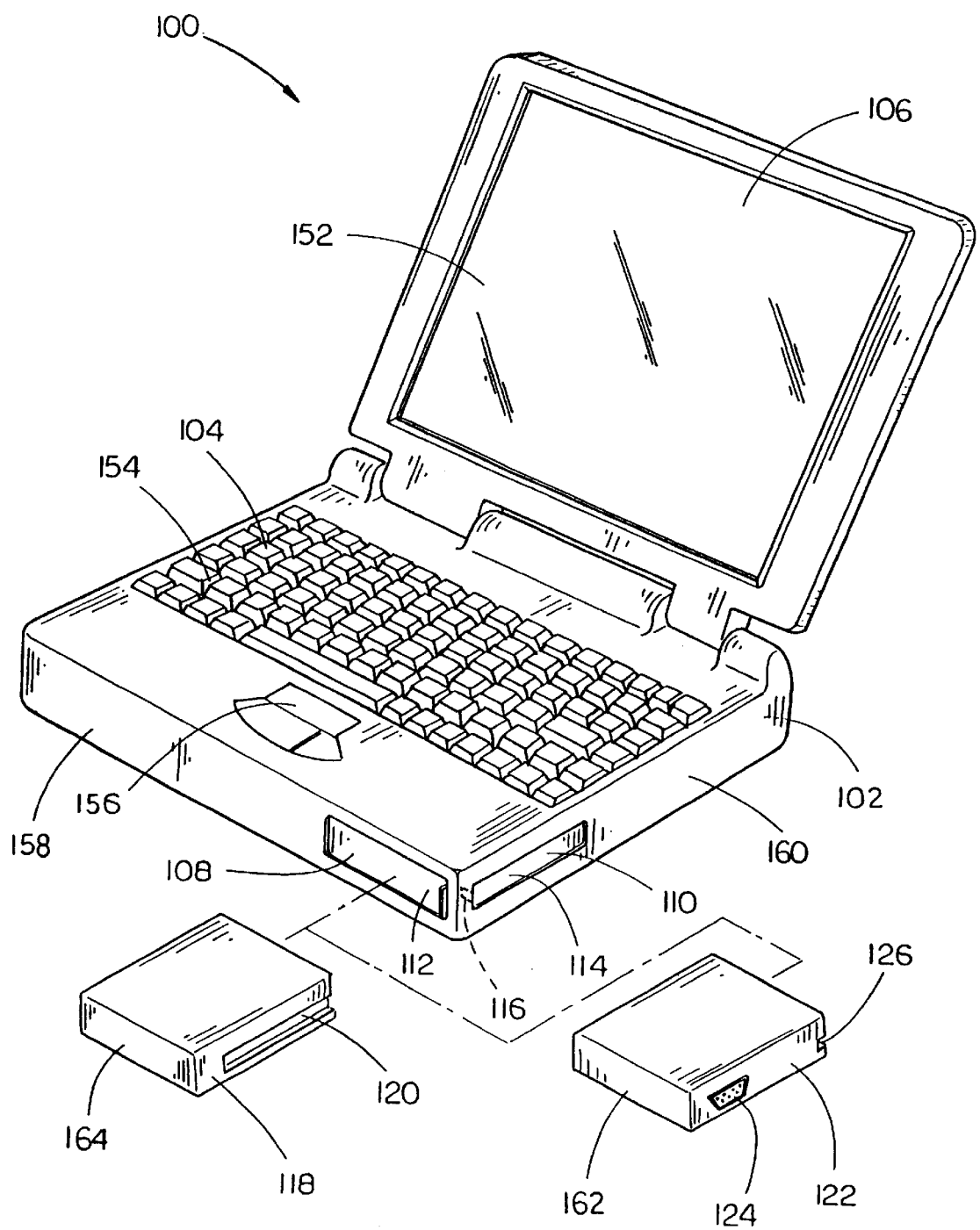
FIG. 1 is an isometric view of a portable computer which comprises an option bay having a secondary access port and automatic sliding door mechanism in accordance with an exemplary embodiment of the present invention.

Referring now to FIG. 1, a computer system is shown which comprises an option bay having a secondary access port and automatic sliding door mechanism in accordance with an exemplary embodiment of the present invention. The computer system 100 is preferably a portable computer such as a notebook or laptop type computer having a clamshell type housing 102. This housing 102 may include a main body section 104 housing the computer's processing system, memory, etc. (see FIG. 5) and providing a keyboard 154 and pointing device 156, and a lid 106 having a built-in display 152 such as an LCD display or the like. Preferably, the main body section 104 and lid 106 may be folded together so that the computer system 100 may be easily carried by a user.

The main body section 104 includes an option bay 108 for receiving interchangeable modular option devices 118 & 122. These option devices 118 & 122 may provide various hardware and software options such as removable hard disk drives, removable floppy disk drives, CD-ROM (Compact Disk-Read Only Memory) drives, DVD (Digital Versatile Disk) drives, modems, ac adapters, batteries, and the like for use with the computer system 100. Preferably, the option bay 108 comprises a generally rectangular aperture in the front face 158 of the main body section 104 sized to allow insertion and removal of a modular option device 118 & 122. As such, the aperture serves as a primary option port to the option bay 108 for receiving the interchangeable modular option devices 118 & 122. An option bay door 112 may cover the aperture to prevent exposure of the option bay 108 to environmental contaminants when the option bay 108 is empty, i.e., when no modular option device 118 & 122 is inserted within the option bay 108.

The option bay 108 may include a secondary access port 110 that opens to the side of the computer system 100. The secondary access port 110 comprises an aperture disposed in the side face 160 of the main body section 104 of the housing 102 which provides direct access to the option bay 108. In this manner, the secondary access port 110 may be used to access to a modular option device 118 & 122 when it is inserted within the option bay 108. This allows uncluttered connection of lines or cables to the modular option device 118 & 122 from the side of the computer system 100.

A secondary access port door 114 may cover the secondary access port 110. Preferably, the secondary access port door 114 prevents exposure of the option bay 108 to environmental contaminants via the secondary access port 110 when no modular option device 118 & 122 is inserted therein. The secondary access port door 114 may include a catch 116 keyed to slide within a channel 120, or, alternatively, engage a notch 126 in a modular option device 118 & 122. When a properly keyed modular option device (e.g., modular option device 122) is inserted into the option bay 108, the catch 116 engages the notch 126 and is forced inwardly (e.g., into the option bay 108) causing the secondary access port door 114 to be at least partially opened. This allows access by the user, via the secondary access port 110, to features 124 such as connectors, jacks, controls, indicators, or the like mounted to the side of the modular option device 122.

For example, as shown in FIG. 1, a first modular option device 122 may be removably inserted into the option bay 108. This modular option device 122 may be, for example, a modem, ac power supply, etc., having a feature 124 such as a connector, port, or the like which requires connection of a line or cable via the secondary access port 110. Thus, the first modular option device 122 may include a notch 126 formed in its housing 162. When the first modular option device 122 is inserted into the option bay 108, this notch 126 may be engaged by the catch 116 extending from the secondary access port door 114 causing the door 114 to be urged from a fully closed position to a fully opened position via the tab/notch contact.

Alternatively, a second modular option device 118 may be removably inserted into the option bay 108 instead of the first modular option device 122. Preferably, the second modular option device 118 contains a hardware or software option which does not require connection of lines or cables via the secondary access port 110 for its operation (e.g., a battery, removable hard disk drive, removable floppy disk drive, CD-ROM drive, DVD drive, etc.). Thus, it is generally preferable that the secondary access port door 114 remain in the closed position when the second modular option device 118 is inserted into the option bay 108 to prevent exposure of the option bay 108 and second modular option device 118 to environmental contaminants via the secondary access port 110. The second modular option device 118 may therefore include a channel 120 formed along one side of its housing 164 to receive the catch 116 extending from the secondary access port door 114 when the device 118 is inserted into the option bay 108. Preferably, the catch 116 slides within the channel 120 and is not pushed inwardly (i.e., into the option bay 108). In this manner, the secondary access port door 114 is not opened by insertion of the second modular option device 118 within the option bay 108.

Figure 2:
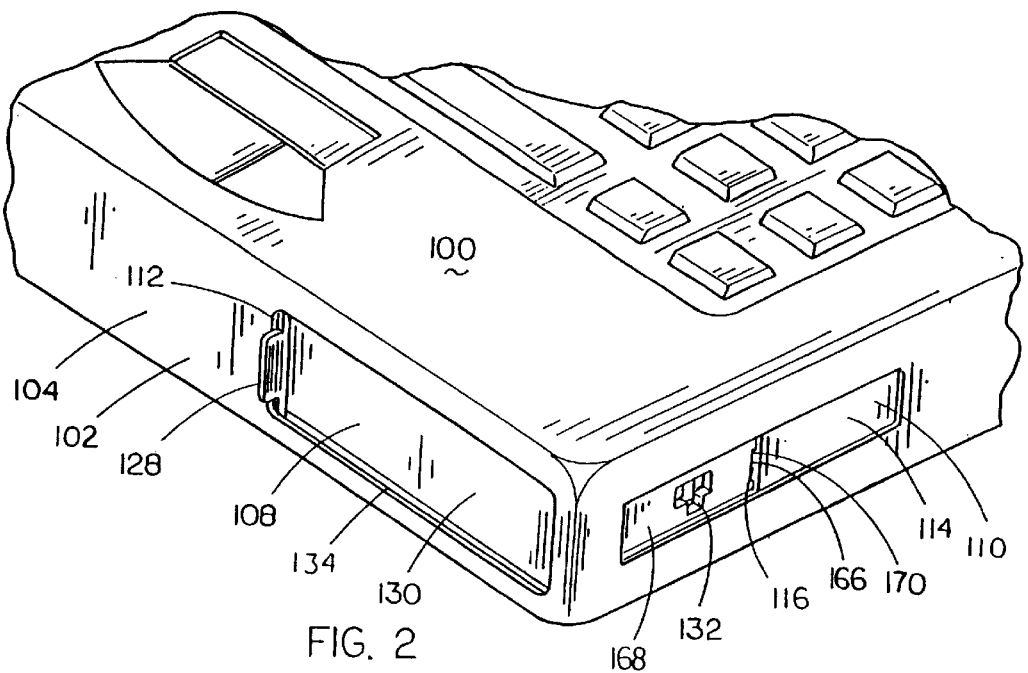
FIG. 2 is an isometric view illustrating detail of the option bay and secondary access port of the portable computer shown in FIG. 1.

Referring now to FIG. 2, a third modular option device having a shortened channel is shown. This modular option device 130 may, for example, contain a modem (not shown) for providing communication between the computer system 100 and external information sources. A coupling device or connector 132 (e.g., an RJ-11 connector (shown), RJ-45 connector, etc.) may be mounted to the side of the third modular option device 130 and interconnected with the modem. An external line or cable (not shown) may be connected to the third modular option device 130 via the coupling device 132 to interconnect the modem with an external network (e.g., the Public Switched Telephone Network (PSTN), a Local Area Network (LAN), a Metropolitan Area Network (MAN), a Wide Area Network (WAN), etc.) so that information may be transferred between the computer system 100 and the external information source.

Preferably, when the third modular option device 130, shown in FIG. 2, is inserted within the option bay 108, the secondary access port door 114 is only partially opened. In this manner, the secondary access port 110 provides access to the coupling device 132 while preventing unnecessary exposure of the modular option device 130 and option bay 108 to environmental contaminants. The third modular option device 130 comprises a shortened channel 166 formed in its housing 168. As the third modular option device 130 is inserted into the option bay 108, the catch 116 extending from the secondary access port door 114 slides within the shortened channel 166 until the end of the channel 170 is reached. The catch 116 then engages the end of the channel 170 causing the secondary access port door 114 to be urged to a partially opened position.

Figure 3:
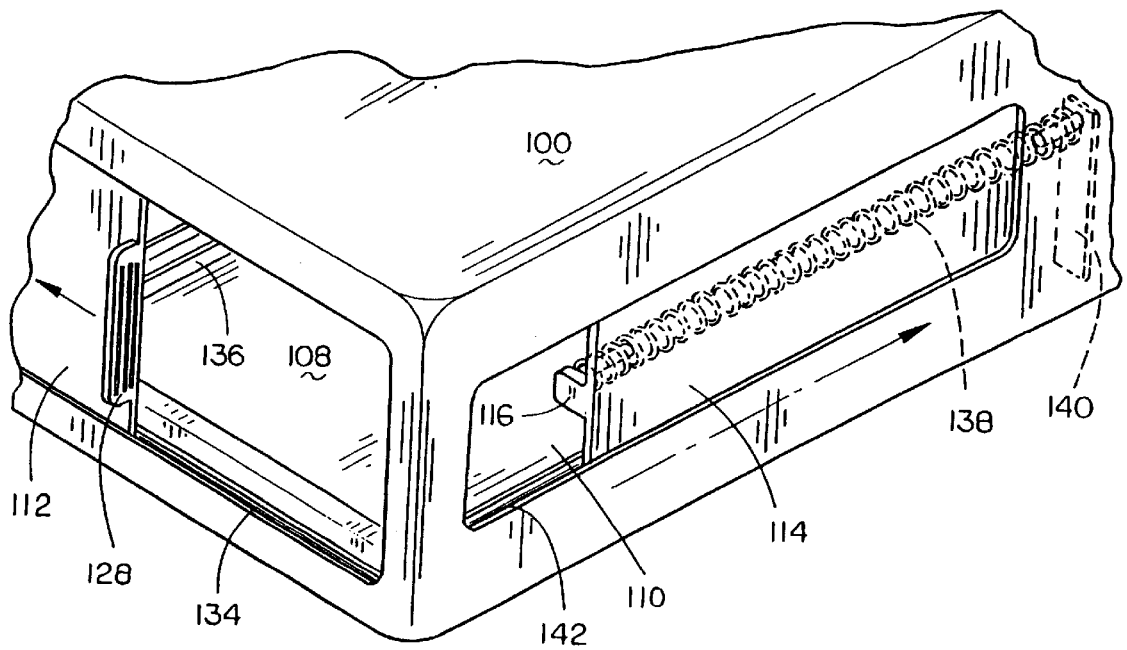
FIG. 3 is an isometric view of the option bay and secondary access port shown in FIG. 1, fuirther illustrating the option bay door and secondary access port door.

As shown in FIG. 3, one or more or guides 136 may guide a selected modular option device 118, 122, or 130 (FIGS. 1 and 2) as it is inserted within the option bay 108 so that the device is properly positioned therein when fully inserted. The option bay 108 may include apparatus (not shown) for interconnecting the modular option device 118, 122 & 130 (FIGS. 1 and 2) with the computer system 100. This apparatus may comprise a conventional connector (e.g., a multiple pin connector, spring contact type connector, banana plug type connector, etc.) mounted to the modular option device 118, 122, & 130 (FIGS. 1 and 2) for mating with a corresponding connector mounted within the option bay 108. The computer system 100 may further comprise conventional apparatus (not shown) for removing or ejecting the modular option device 118, 122, & 130 (FIGS. 1 and 2) from the option bay 108.

As shown in FIGS. 2 and 3, the option bay door 112 may slide in upper and lower tracks 134 so that it may be opened to allow insertion of a modular option device 118, 122, 130 (FIGS. 1 and 2) within the option bay 108. Preferably, a user may open the option bay door 112 by grasping a tab 128 extending outwardly from the door and sliding the door 112 within the main body section 104 of the housing 102. Alternatively, the option bay door 112 may be hinged so that when a modular option device 118, 122, & 130 (FIGS. 1 and 2) is inserted in the option bay 108, the door 112 is rotated inwardly and out of the way of the modular option device 118, 122 & 130 (FIGS. 1 and 2). A spring (not shown) may be provided to return the door 112 to its closed position when the modular option device 118, 122 & 130 (FIGS. 1 and 2) is removed.

A conventional removable cover (not shown) may be utilized in place of a door 112 to cover the option bay 108. To access the option bay 108 for insertion of a modular option device 118, 122 & 130 (FIGS. 1 and 2), the user would remove this cover from the housing 102. Preferably, the cover could then be replaced when the modular option device 118, 122 & 130 (FIGS. 1 and 2) is removed from the option bay 108.

As shown in FIG. 3, the secondary access port 110 may include upper and lower tracks 142. The secondary access port door 114 may slide within these tracks 142 between a fully closed position and a fully opened position. As discussed, supra, the secondary access port door 114 preferably includes a catch 116 which engages a notch 126 in a properly keyed modular option device (e.g., modular option devices 122 & 130 shown in FIGS. 1 and 2). As the modular option device 122 & 130 (FIGS. 1 and 2) is inserted within the option bay 108, it forces the catch 116 to move inwardly, urging the secondary access port door 114 from a closed position to an at least partially open position. A spring 138 may extend between the catch 116 and a support 140 attached to the main body section 104 of the housing 102. This spring 138 may provide sufficient force to slide the secondary access door 114 from any partially or fully opened position to the closed position when the modular option device 122 & 130 (FIGS. 1 and 2)is removed from the option bay 108. Preferably, the spring 138 also retains the secondary access port door 114 in the closed position until a properly keyed modular option device 122 & 130 (FIGS. 2 and 3) is inserted into the option bay 108.

Figure 4A:
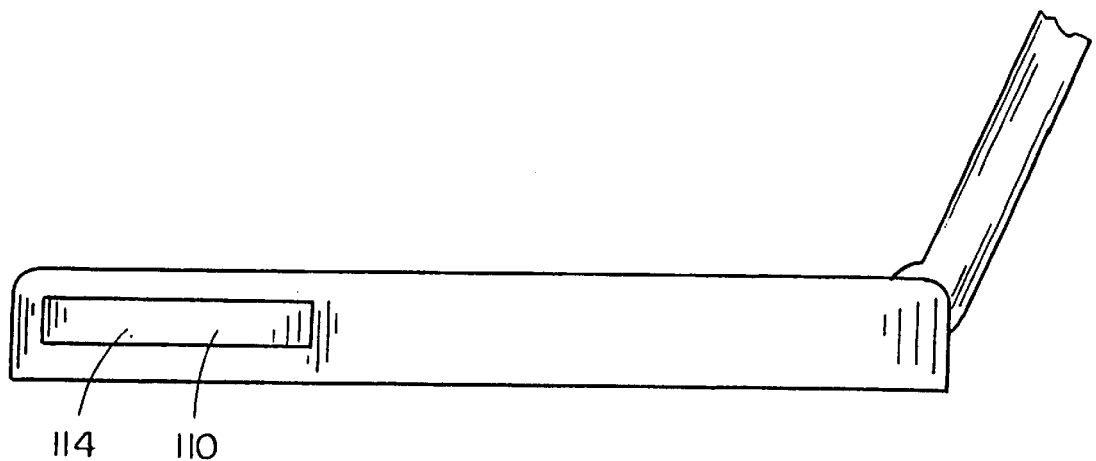
FIG. 4A is a side elevational view of the portable computer shown in FIG. 1, wherein the secondary access port door is completely closed.
Figure 4B:
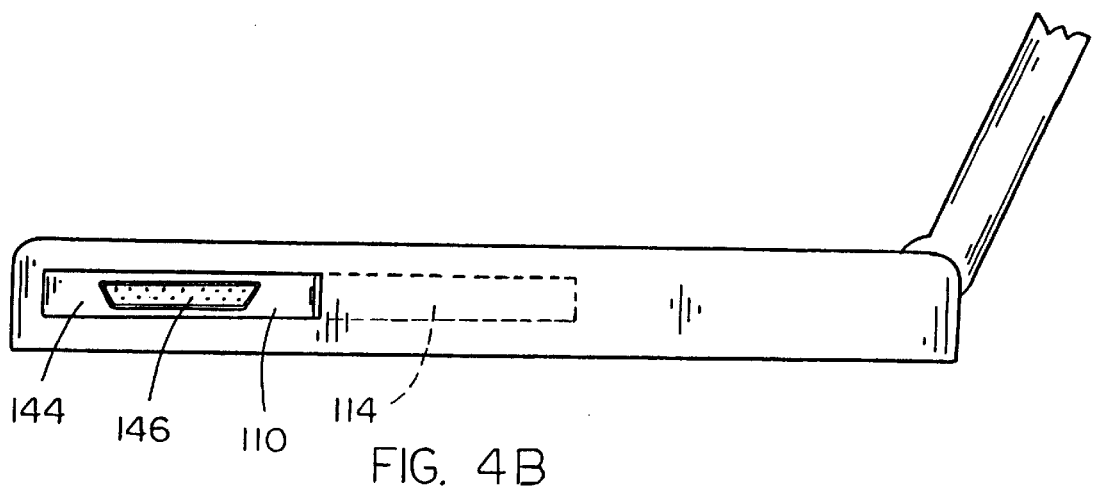
FIG. 4B is a side elevational view of the portable computer shown in FIG. 1, wherein the secondary access port door is fully opened by a modular option device inserted into the option bay.
Figure 4C:
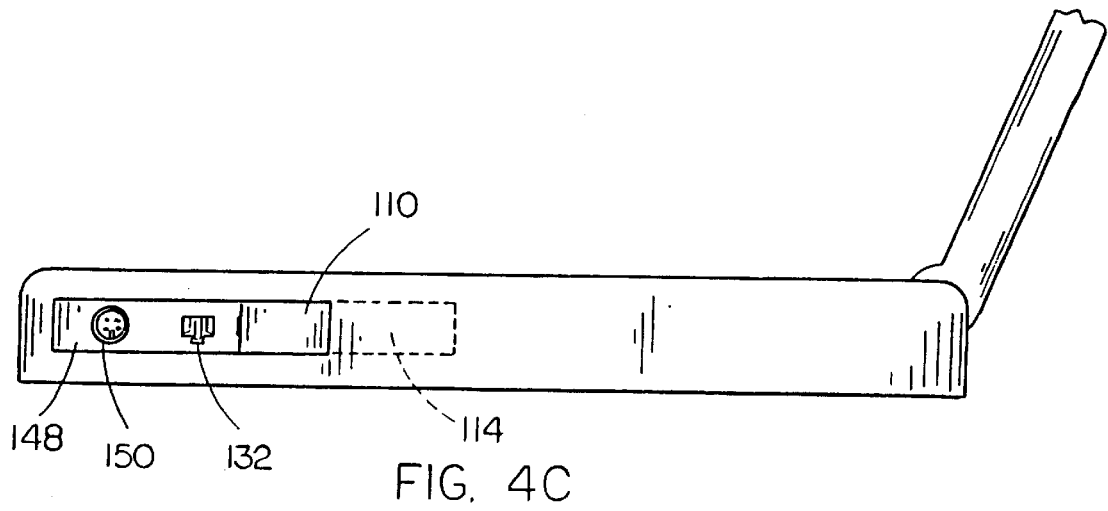
FIG. 4C is a side elevational view of the portable computer shown in FIG. 1, wherein the secondary access port door is partially opened by a modular option device inserted into the option bay.

Referring now to FIGS. 4A through 4C, the secondary access port and secondary access port door are shown. The secondary access port door 114 may slide between a fully closed position, shown in FIG. 4A, and a fully opened position, shown in FIG. 4B, to allow access by the user to one or more coupling devices 132, ports 146, or ac power connectors 150 via the secondary access port 110. As shown in FIG. 4A, the secondary access port door 114 may be held in a fully closed position when the option bay is empty or when a modular option device having no external coupling devices is inserted therein. When a modular option device (such as fourth modular option device 144) is inserted in the option bay, as shown in FIG. 4B, the secondary access port door 114 may be moved to the fully opened position allowing access to a port 146 such as a multiple pin connector or the like. Alternatively, a fifth modular option device 148 may cause the secondary access port door 114 to be only partially opened as shown in FIG. 4C.

Figure 5:
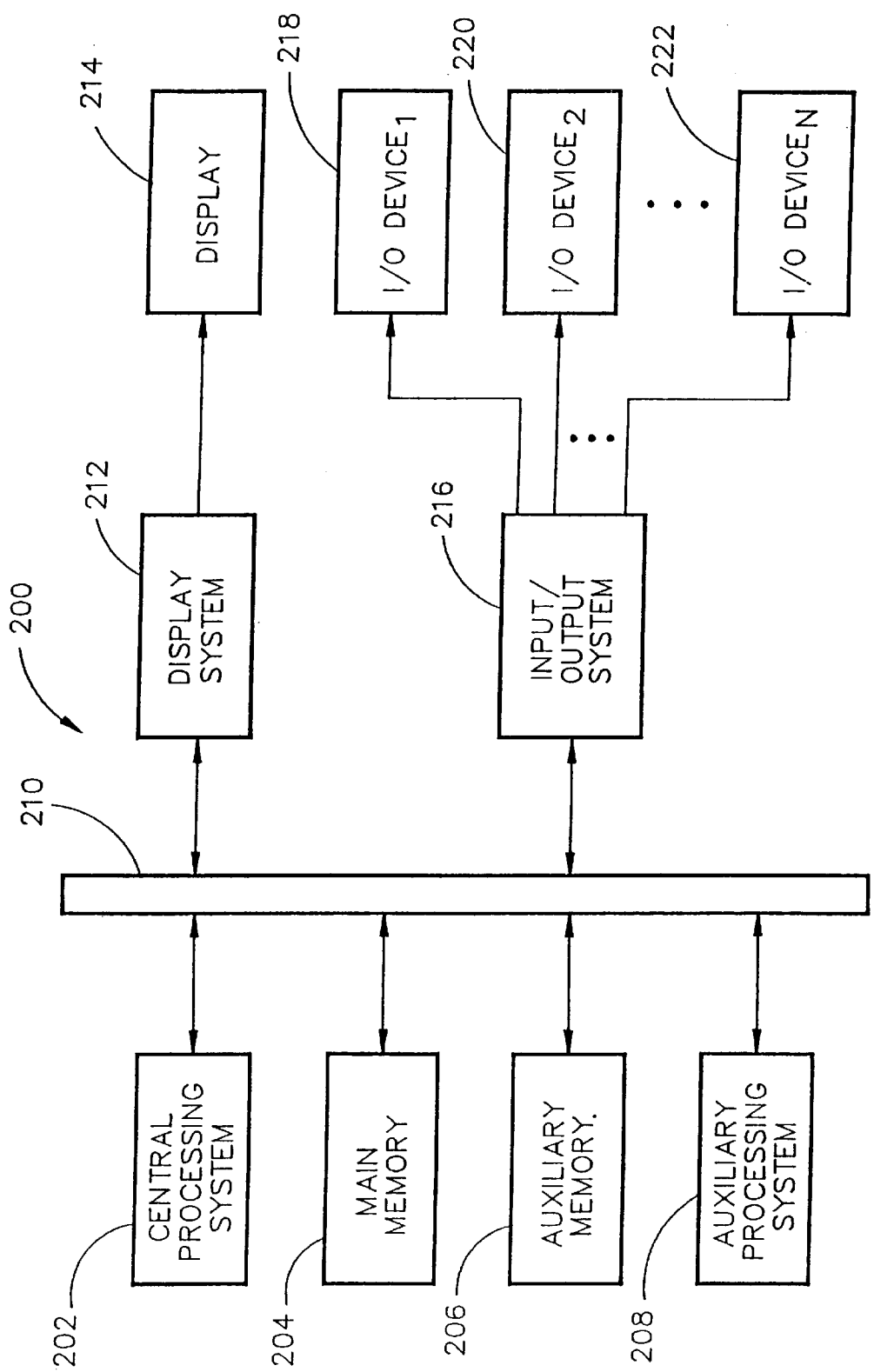
FIG. 5 is a block diagram depicting a typical hardware environment of a computer system in accordance with the present invention.

Referring now to FIG. 5, a block diagram of a typical computer system which may employ the present invention is illustrated. The computer system 200 is controlled by a central processing system 202. The central processing system 202 includes a central processing unit such as a microprocessor or microcontroller for executing programs, performing data manipulations and controlling the tasks of the computer system 200. Communication with the central processing system 202 is implemented through a system bus 210 for transferring information among the components of the computer system 200. The bus 210 may include a data channel for facilitating information transfer between storage and other peripheral components of the hardware system. The bus 210 further provides the set of signals required for communication with the central processing system 202 including a data bus, address bus, and control bus. The bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the computer system 200 include main memory 204, auxiliary memory 206, and an auxiliary processing system 208 as required. The main memory 204 provides storage of instructions and data for programs executing on the central processing system 202. The main memory 204 is typically semiconductor based memory such as dynamic random access memory (DRAM) and or static random access memory (SRAM). The auxiliary memory 206 provides storage of instructions and data that are loaded into the main memory 204 before execution. The auxiliary memory 206 may include semiconductor based memory such as read-only memory (ROM), programmable read-only memory (PROM) erasable programmable read-only memory (EPROM), electrically erasable read-only memory (EEPPOM), or flash memory (block oriented memory similar to EEPROM). The auxiliary memory 206 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. The computer system 200 may optionally include an auxiliary processing system 208 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

The computer system 200 further includes a display system 212 for connecting to a display device 214, and an input/output (I/O) system 216 for connecting to one or more I/O devices 218, 220 up to N number of I/O devices 222. The display system 212 may comprise a video display adapter having all of the components for driving the display device, including video random access memory (VRAM), buffer, and graphics engine as desired. The display device 214 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 216 may comprise one or more controllers or adapters for providing interface functions between the one or more I/O devices 218–222. For example, the input/output system 216 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. The input/output system 216 and I/O devices 218–222 may provide or receive analog or digital signals for communication between the hardware system 200 of the present invention and external devices, networks, or information sources. The input/output system 216 and I/O devices 218–222 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the computer system 200 of FIG. 5 by one having ordinary skill in the art would not depart from the scope or the spirit of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An option bay for a computer system capable of removably receiving one of a first modular option device and a second modular option device through a primary access port, the option bay comprising:
    a secondary access port for providing direct access to the option bay; and
    a door for covering the secondary access port, the door being capable of moving between a fully closed position and a fully open position,
    wherein insertion of the first modular option device into the option bay causes the door to be moved to a first position, and insertion of the second modular option device into the option bay causes the door to be moved to a second position, the first and second positions being between the fully closed position and the fully open position.

2. The option bay of claim 1, wherein the door is slidably mounted in the secondary access port so that the door may slide between the fully closed position and the fully opened position.

3. The option bay of claim 1, wherein the door comprises a catch disposed thereon, the catch being suitable for engaging at least one of the first and second modular option devices for moving the door.

4. The option bay of claim 3, further comprising a spring coupled to the door for automatically closing the door when at least one of the first and second modular option device is removed from the option bay.

5. The option bay of claim 4, wherein the door is configured so as to be further opened manually by a human user when in a position other than the fully open position.

6. The option bay of claim 1, further comprising a channel for receiving the first and second modular option devices within the option bay.

7. The option bay of claim 6, further comprising a second door for covering the option bay.

8. The option bay of claim 1 being further capable of removably receiving a third modular option device through the primary access port, wherein insertion of the third modular option device into the option bay causes the door to stay in the fully closed position.

9. A computer system capable of removably receiving one of a first modular option device and a second modular option device through a primary access port, the computer system comprising:
    an option bay for receiving one of the first modular option device and the second modular option device;
    a secondary access port for providing direct access to the option bay; and
    a door for covering the secondary access port, the door being capable of moving between a fully closed position and a fully open position,
    wherein insertion of the first modular option device into the option bay causes the door to be moved to a first position, and insertion of the second modular option device into the option bay causes the door to be moved to a second position, the first and second positions being between the fully closed position and the fully open position.

10. The computer system of claim 9, wherein the door is slidably mounted in the secondary access port so that the door may slide between the fully closed position and the fully opened position.

11. The computer system of claim 9, wherein the door comprises a catch disposed thereon, the catch being suitable for engaging at least one of the first and second modular option devices for moving the door.

12. The computer system of claim 11, further comprising a spring coupled to the door for automatically closing the door when at least one of the first and second modular option device is removed from the option bay.

13. The computer system of claim 9, further comprising a channel for receiving the first and second modular option devices within the option bay.

14. The computer system of claim 13, further comprising a second door for covering the option bay.

15. The option bay of claim 14, wherein the door for covering the secondary access port is configured so as to be further opened manually by a human user when in a position other than the fully open position.

16. The computer system of claim 9, being fuirther capable of removably receiving a third modular option device through the primary access port, wherein insertion of the third modular option device into the option bay causes the door to stay in the fully closed position.

17. A computer system capable of removably receiving one of a first modular option device and a second modular option device through a primary access port, the computer system comprising:
    an option bay for receiving one of the first modular option device and the second modular option device;
    a secondary access port for providing direct access to the option bay; and
    a door for covering the secondary access port, the door being capable of moving between a fully closed position and a fully open position,
    wherein insertion of the first modular option device into the option bay causes the door to stay in the fully closed position, and insertion of the second modular option device into the option bay causes the door to be moved to one of a partially opened position and the fully opened position.

18. The computer system of claim 17, wherein the door is slidably mounted in the secondary access port so that the door may slide between the fully closed position and the fully opened position.

19. The computer system of claim 17, wherein the door comprises a catch disposed thereon, the catch being suitable for engaging at least one of the first and second modular option devices for moving the door.

20. The computer system of claim 19, further comprising a spring coupled to the door for automatically closing the door when at least one of the first and second modular option device is removed from the option bay.

21. The computer system of claim 17, further comprising a channel for receiving the first and second modular option devices within the option bay.

22. The computer system of claim 21, further comprising a second door for covering the option bay.

23. A computer system capable of removably receiving one of a first modular option device and a second modular option device, the computer system comprising:

means for receiving one of the first modular option device and the second modular option device;

means for providing direct access to the option bay; and means for covering the direct access means, the covering means being capable of moving between a fully closed position and a fully open position, wherein insertion of the first modular option device into the receiving means causes the covering means to be moved to a first position, and insertion of the second modular option device into the receiving means causes the covering means to be moved to a second position, the first and second positions being between the fully closed position and the fully open position.

24. The computer system of claim 23, wherein the covering means is slidably mounted in the direct access providing means so that the covering means may slide between the fully closed position and the fully opened position.

25. The computer system of claim 23, wherein the covering means comprises means for engaging at least one of the first and second modular option devices for moving the covering means.

26. The computer system of claim 25, further comprising means for automatically closing the covering means when at least one of the first and second modular option device is removed from the receiving means.

27. The computer system of claim 23, further comprising means for covering the receiving means.

* * * * *